US009001354B2

(12) United States Patent
Enomoto et al.

(10) Patent No.: US 9,001,354 B2
(45) Date of Patent: Apr. 7, 2015

(54) IMAGE FORMING DEVICE THAT AUTOMATICALLY RETRANSMITS REQUEST DATA TO NETWORK SERVER

(75) Inventors: Katsunori Enomoto, Toyokawa (JP); Yuji Sato, Nagoya (JP); Masatoshi Kokubo, Aichi-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 3009 days.

(21) Appl. No.: 10/384,657

(22) Filed: Mar. 11, 2003

(65) Prior Publication Data

US 2003/0184798 A1 Oct. 2, 2003

(30) Foreign Application Priority Data

Mar. 27, 2002 (JP) ................. P2002-089209

(51) Int. Cl.
G06F 15/00 (2006.01)
H04N 1/32 (2006.01)
H04N 1/00 (2006.01)
G03G 15/08 (2006.01)

(52) U.S. Cl.
CPC ....... *H04N 1/32635* (2013.01); *H04N 1/00209* (2013.01); *H04N 1/00244* (2013.01); *H04N 1/32662* (2013.01); *H04N 1/32667* (2013.01); H04N 2201/0039 (2013.01); H04N 2201/0082 (2013.01); H04N 2201/0086 (2013.01)

(58) Field of Classification Search
USPC ........ 358/1.15, 426, 437, 400, 435, 466, 468; 379/93.01–93.37
See application file for complete search history.

(56) References Cited

U.S. PATENT DOCUMENTS

| 4,748,638 | A | * | 5/1988 | Friedman et al. | ............. 375/222 |
| 4,887,162 | A | * | 12/1989 | Arai | ............................. 358/400 |
| 5,537,626 | A | * | 7/1996 | Kraslavsky et al. | ............. 710/8 |
| 5,613,160 | A | * | 3/1997 | Kraslavsky et al. | ............. 710/16 |
| 5,854,693 | A | * | 12/1998 | Yoshiura et al. | .............. 358/468 |
| 6,018,816 | A | * | 1/2000 | Tateyama | ...................... 714/746 |
| 6,101,244 | A | * | 8/2000 | Okada | ...................... 379/100.08 |
| 6,330,067 | B1 | * | 12/2001 | Murata | ...................... 358/1.12 |
| 6,388,760 | B2 | * | 5/2002 | Kadota et al. | ................ 358/1.14 |
| 6,462,831 | B1 | * | 10/2002 | Akiyama | ..................... 358/1.14 |
| 6,515,757 | B1 | * | 2/2003 | Matsuo et al. | ............... 358/1.15 |
| 6,529,692 | B1 | * | 3/2003 | Haines et al. | ................... 399/27 |
| 6,600,569 | B1 | * | 7/2003 | Osada et al. | ................. 358/1.12 |
| 6,657,743 | B1 | * | 12/2003 | Otsuka et al. | ................ 358/1.15 |
| 6,700,674 | B1 | * | 3/2004 | Otsuka et al. | ................ 358/1.15 |
| 6,700,959 | B2 | * | 3/2004 | Kotsuki | ................ 379/100.01 |
| 6,775,026 | B1 | * | 8/2004 | Kato | ........................... 358/1.15 |

(Continued)

FOREIGN PATENT DOCUMENTS

JP A-10-214163 8/1998
JP A 11-164071 6/1999

(Continued)

*Primary Examiner* — Peter K Huntsinger
*Assistant Examiner* — Pawandeep Dhingra
(74) *Attorney, Agent, or Firm* — Oliff PLC

(57) ABSTRACT

An image forming device transmits a transmission request data to a server on a network and receives content data from the server. The received content data is printed on a recording medium, and the transmission request data transmitted to the server is stored in a memory. When print error is detected before the received data was completely printed, the image forming device notifies a user of the print error. After the print error is resolved, the image forming device automatically retransmit the transmission request data to the server.

20 Claims, 10 Drawing Sheets

(56) References Cited

U.S. PATENT DOCUMENTS

| | | | |
|---|---|---|---|
| 6,804,018 B1 * | 10/2004 | Mochizuki | 358/1.14 |
| 6,831,754 B1 * | 12/2004 | Delaney | 358/1.15 |
| 6,947,161 B2 * | 9/2005 | Suyehira | 358/1.15 |
| 6,972,858 B1 * | 12/2005 | Nishida et al. | 358/1.15 |
| 6,977,742 B2 * | 12/2005 | Harper | 358/1.15 |
| 7,027,176 B2 * | 4/2006 | Tanimoto | 358/1.15 |
| 7,095,519 B1 * | 8/2006 | Stewart et al. | 358/1.15 |
| 7,102,769 B2 * | 9/2006 | Cox | 358/1.14 |
| 7,139,093 B2 * | 11/2006 | Iida | 358/1.15 |
| 7,256,902 B1 * | 8/2007 | Morikawa et al. | 358/1.14 |
| 7,283,258 B1 * | 10/2007 | Kuno et al. | 358/1.13 |
| 7,372,588 B1 * | 5/2008 | Jeong | 358/1.15 |
| 7,436,548 B2 * | 10/2008 | Kumazawa | 358/1.9 |
| 2002/0060809 A1 * | 5/2002 | Aoki | 358/1.15 |
| 2003/0067625 A1 * | 4/2003 | Kim | 358/1.15 |
| 2003/0184798 A1 * | 10/2003 | Enomoto et al. | 358/1.15 |

FOREIGN PATENT DOCUMENTS

| | | | | |
|---|---|---|---|---|
| JP | A-11-321046 | | 11/1999 | |
| JP | 2000-103083 | * | 4/2000 | B41J 2/175 |
| JP | A-2000-103083 | | 4/2000 | |
| JP | 2000-235473 | * | 8/2000 | B41J 21/00 |
| JP | A-2000-235473 | | 8/2000 | |
| JP | A 2001-339549 | | 12/2001 | |
| JP | A 2001-339561 | | 12/2001 | |

* cited by examiner

FIG.10

| ID | CONDITION | PRINT PERMISSION |
|---|---|---|
| 1 | MONOCHROME | × |
| 2 | LOWER-RESOLUTION | × |
| 3 | 2-IN-1 | ○ |
| 4 | 4-IN-1 | ○ |

IMAGE FORMING DEVICE THAT AUTOMATICALLY RETRANSMITS REQUEST DATA TO NETWORK SERVER

BACKGROUND OF THE INVENTION

1. Field of the Invention

The present invention relates to an image forming device capable of acquiring data content from a server on the Internet and directly printing the data content, a network server that responds to accesses from this type of image forming device, and a communication method by which the image forming device and the network server communicate.

2. Description of the Related Art

In recent years, a broadband-enabled environment is gradually being developed through such improvements in the Internet infrastructure as Asymmetric Digital Subscriber Line (ADSL), Cable Television (CATV) networks, and Fiber to the Home (FTTH). As a result, the method in which an individual user connects to the Internet is changing from an on-demand connection method, such as a dialup connection, to a constant connection method.

The most common usage of the Internet is the exchange of data content, such as web pages and e-mail, between computers. Recently, however, multifunctional devices including printer, scanner, copier, telephone, facsimile, and other functions have also been provided with a function to connect to the Internet, enabling terminal devices other than computers to use services on the Internet in a constant-connection environment. Therefore, these types of multifunctional devices can connect to the Internet as a data communication terminal without requiring an intermediary computer and can directly print content acquired from a web server.

However, when this type of multifunctional device prints such data content directly, sometimes the device is unable to complete printing of all content due to the occurrence of a print error, such as a paper jam error, an out-of-paper error, or ink or toner empty error, during or just prior to performing the printing process. In such a case, a user must first disconnect from the Internet, resolve the print error, and then re-specify the Uniform Resource Locator (URL) as the address indicating the location at which the desired content is located, involving a tedious operation. This operation is particularly complicated if the user has to input each character in the character string making up the URL, but the process is also tedious when re-selecting a URL from a menu if there are numerous selections to choose from.

SUMMARY OF THE INVENTION

In view of the foregoing, it is an object of the present invention to provide an image forming device capable of reducing the user's operation load by automatically reprinting data content when a print error occurs as the data content is being printed or just prior to the printing operation, a network server that responds to such accesses from the image forming device, and a communication method used between the image forming device and the network server.

In order to overcome the above and other objects, according to the present invention an image forming device including a communication unit that transmits a transmission request data to a server on a network and that receives data content that the server transmits in response to the transmission request data, a print unit that prints the data content, a memory that stores the transmission request data that the communication unit has transmitted to the server, an error detecting unit that detects print error that occurs before the print unit completes printing the data content, an error-recovery detecting unit that detects recovery of the print error, and a control unit that controls the transmission unit. When the error detecting unit detects the print error, the control unit controls the communication unit to retransmit the transmission request data stored in the memory to the server after the error-recovery detecting unit detects the recovery.

There is also provided an image forming device including a communication unit that transmits a transmission request data to a server on a network and that receives data content that the server transmits in response to the transmission request data, a print unit that prints the data content, a memory that stores an address of the server to which the communication unit has transmitted the transmission request data, an error detecting unit that detects print error that occurs before the print unit completes printing the data content, an error-recovery detecting unit that detects recovery of the print error, and a control unit that controls the transmission unit. When the error detecting unit detects the print error, the control unit controls the communication unit to transmit a retransmission request to the server whose address is stored in the memory after the error-recovery detecting unit detects the recovery, the retransmission request requesting the server to retransmit the data content which the server has transmitted in response to the transmission request data.

There is also provided a network server including a communication unit that receives a transmission request data from a terminal on a network and that transmits data content to the terminal in response to the transmission request data, the transmission request data being received along with a print resource data, a determining unit that determines whether or not the terminal is capable of print the data content based on the print resource data, and a notifying unit that notifies the terminal of a determination result of the determining unit.

There is also provided a communication method including the steps of a) transmitting a transmission request data to a server on a network, b) storing, into a memory, the transmission request data transmitted to the server in the step a), c) receiving data content that the server transmits in response to the transmission request data, d) printing the data content, e) detecting whether or not print error occurred before the printing of the data content has completed, f) detecting recovery of the print error if the print error was detected in the step e), and g) retransmitting the transmission request data stored in the memory to the server after the recovery was detected in the step f).

There is also provided a communication method including the steps of a) transmitting a transmission request data to a server on a network, b) storing, into a memory, an address of the server to which the transmission request data was transmitted in the step a), c) receiving data content that the server transmits in response to the transmission request data, d) printing the data content, e) detecting whether or not print error occurred before the printing of the data content has completed, f) detecting recovery of the print error if the print error was detected in the step e), and g) transmitting a retransmission request data to the server whose address is stored in the memory after the recovery was detected in the step f).

There is also provided a communication method of a server. The communication method includes a) receiving a transmission request and a resource information from a terminal, the transmission request requesting the server to transmit data content to the terminal, b) determining whether or not the terminal can print the data content based on the resource information, and c) notifying a determination result to the terminal.

BRIEF DESCRIPTION OF THE DRAWINGS

In the drawings:

FIG. 10 is a table showing print-permission settings.

DESCRIPTION OF PREFERRED EMBODIMENTS

Next, preferred embodiments of the present invention will be described with reference to the attached drawings.

Figure 1:
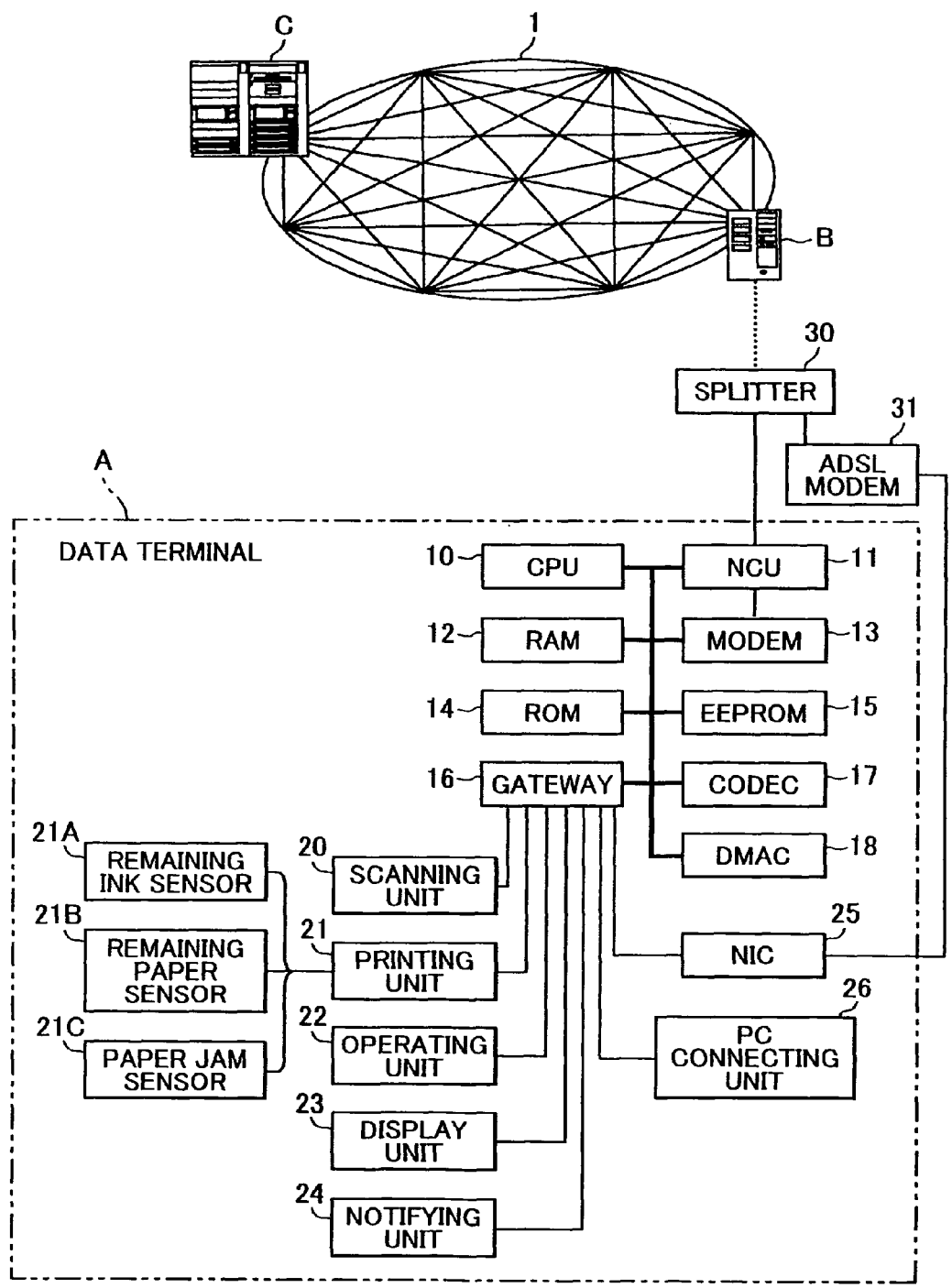
FIG. 1 is a block diagram of a data terminal connected to a network server according to an embodiment of the present invention.

A data terminal A shown in FIG. 1 is an image forming device according to the present invention, and is provided with an Internet connecting function in addition to printer, scanner, copier, telephone, and facsimile functions. The data terminal A is constantly connected to an Internet 1 via a splitter 30 and an ADSL modem 31 provided in the home and using a broadband connecting method. A web server C exists on the Internet 1 as a network server, and exchanges data content, such as web pages and e-mail, with the data terminal A and other computers (not shown). The various web pages provided on the web server C may include data that can be freely browsed at no cost, such as television schedules and online manuals, as well as fee-based services, such as news articles, that require an electronic payment or the like for each access.

When the data terminal A issues a request to the web server C for the transmission of data content, a request including a URL is transmitted from the data terminal A to the web server C via the ADSL modem 31, the splitter 30, a subscriber line represented by a dotted line in FIG. 1, a telephone exchange B, and the Internet 1. While the internal construction of the telephone exchange B is not shown in detail in the drawing, the request from the data terminal A can reach the web server C on the Internet 1 via a main distributing frame (MDF) and an in-office splitter and router. In response, the web server C transfers the requested data content to the data terminal A along the same path in reverse.

When the data terminal A transmits facsimile data to a remote facsimile device, the facsimile data is transmitted to the remote facsimile device via the splitter 30, the telephone exchange B, and a public telephone network (not shown). In this case, the facsimile data passes through the MDF, in-office splitter, and an exchange in the telephone exchange B and reaches the remote facsimile device connected to a public telephone network. When the remote facsimile device transmits facsimile data to the data terminal A, the data travels along the same path in reverse to reach the data terminal A.

As shown in FIG. 1, the data terminal A includes a central processing unit (CPU) 10, a Network Control Unit (NCU) 11, a random access memory (RAM) 12, a modem 13, a read only memory (ROM) 14, an EEPROM 15, a gateway 16, a CODEC 17, and a Direct Memory Access (DMA) controller 18, all connected via a bus. The data terminal A also includes a scanning unit 20, a printing unit 21, an operating unit 22, a display unit 23, a notifying unit 24, an Network Interface Card (NIC) 25, and a personal computer connecting unit 26, all connected to the gateway 16.

The CPU 10 controls entire operations of the data terminal A. The NCU 11 connects to the subscriber line via the splitter 30 to control the network. The RAM 12 provides a work area for the CPU 10, storage areas for various data, and the like. The modem 13 modulates and de-modulates facsimile data. The ROM 14 stores programs and the like that are executed by the CPU 10. The EEPROM 15 stores various flags, settings, and the like. The gateway 16 exchanges various signals between the CPU 10 and each of the units 21 through 26. The CODEC 17 encodes and decodes facsimile data. The DMA controller 18 serves as a bus arbiter to directly control writing of data to the RAM 12.

Although not shown in the drawings, the scanning unit 20 includes an image sensor, an LED light source, and the like for scanning images from an original document and the like. The printing unit 21 performs color printing by an inkjet printing method, for example. The printing unit 21 is provided with a remaining ink sensor 21A for detecting the amount of remaining ink used for printing, a remaining paper sensor 21B for detecting the number of sheets of remaining paper loaded in a feeding unit 21D (FIG. 2), and a paper jam sensor 21C for detecting paper jams along a paper conveying path of the data terminal A. Sensor signals from the sensors 21A, 21B, and 21C are transferred to the CPU 10 via the gateway 16.

Figure 2:
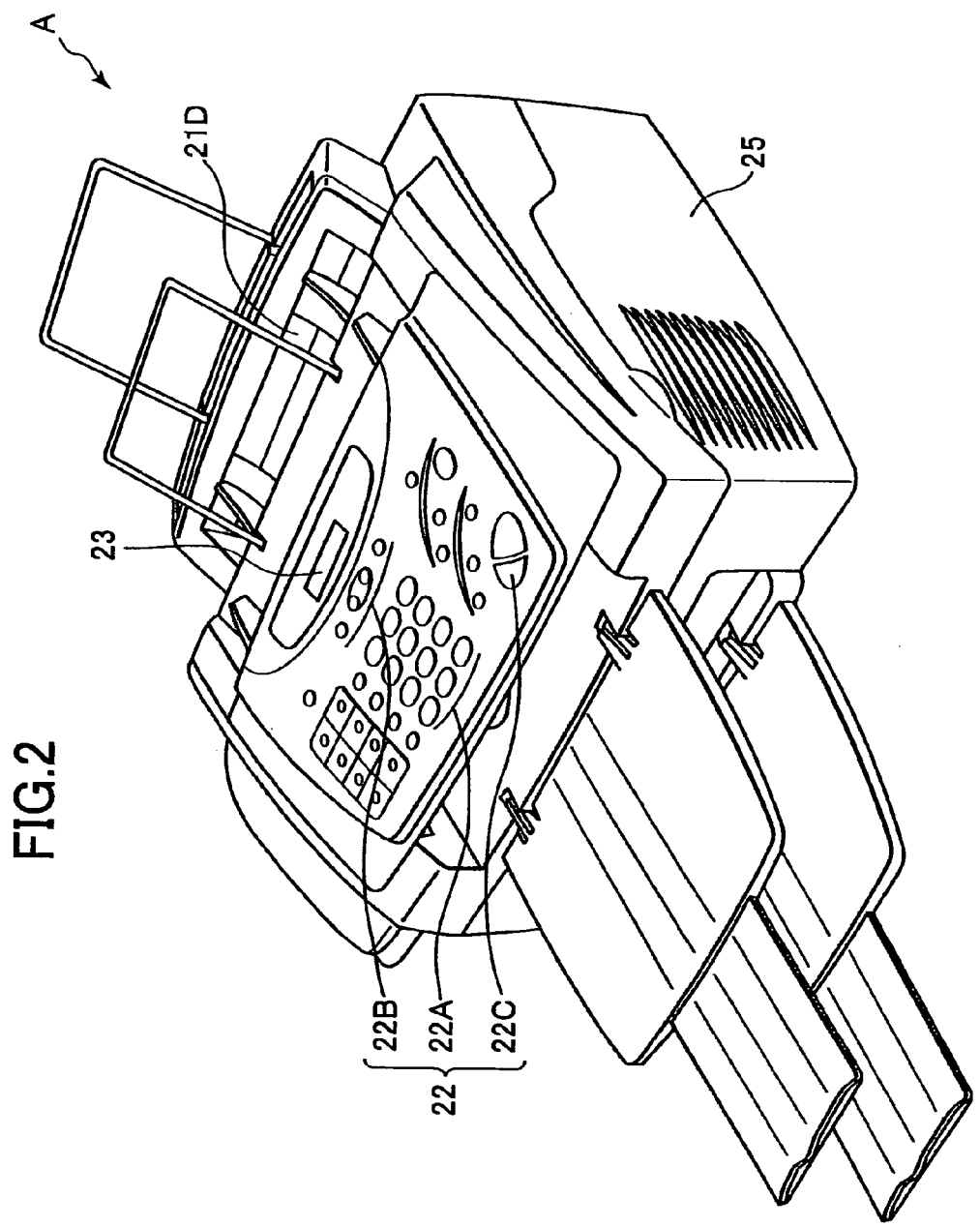
FIG. 2 is a perspective view of the data terminal.

As shown in FIG. 2, the operating unit 22 includes a ten-key pad 22A for inputting alphanumeric characters, display control keys 22B for performing operations according to the content displayed on the display unit 23, and function keys 22C for performing other operations. Control signals from the keys 22A, 22B, and 22C are transferred to the CPU 10 via the gateway 16. The display unit 23 includes a relatively small liquid crystal display, for example, that displays a few lines of data as controlled by the CPU 10. The notifying unit 24 includes a speaker or the like (not shown) for generating various tonal notification sounds as controlled by the CPU 10. The NIC 25 enables the data terminal A to be connected to a LAN. However, in the present embodiment, the ADSL modem 31 is connected to the NIC 25. The personal computer connecting unit 26 is used when connecting the data terminal A to a personal computer via a Universal Serial Bus (USB) cable or the like.

While a specific construction of the web server C is not shown in the drawings, the construction does not differ physically much from that of a personal computer, except that the web server C is provided with a large-capacity hard disk for storing a large quantity of data and a means for providing an Internet service with great efficiency. In other words, the data terminal A and the web server C are configured to facilitate the exchange of data content between the two and to facilitate a web printing process for printing data content from the web server C on the data terminal A end, thereby increasing the convenience to the user of this web printing service. These operations will be described in detail based on the following flowcharts.

First, a web printing process and a server process according to a first embodiment of the present invention will be described. The web printing process is executed by the CPU 10 of the data terminal A, and the server process is executed by the web server C.

Figure 3:
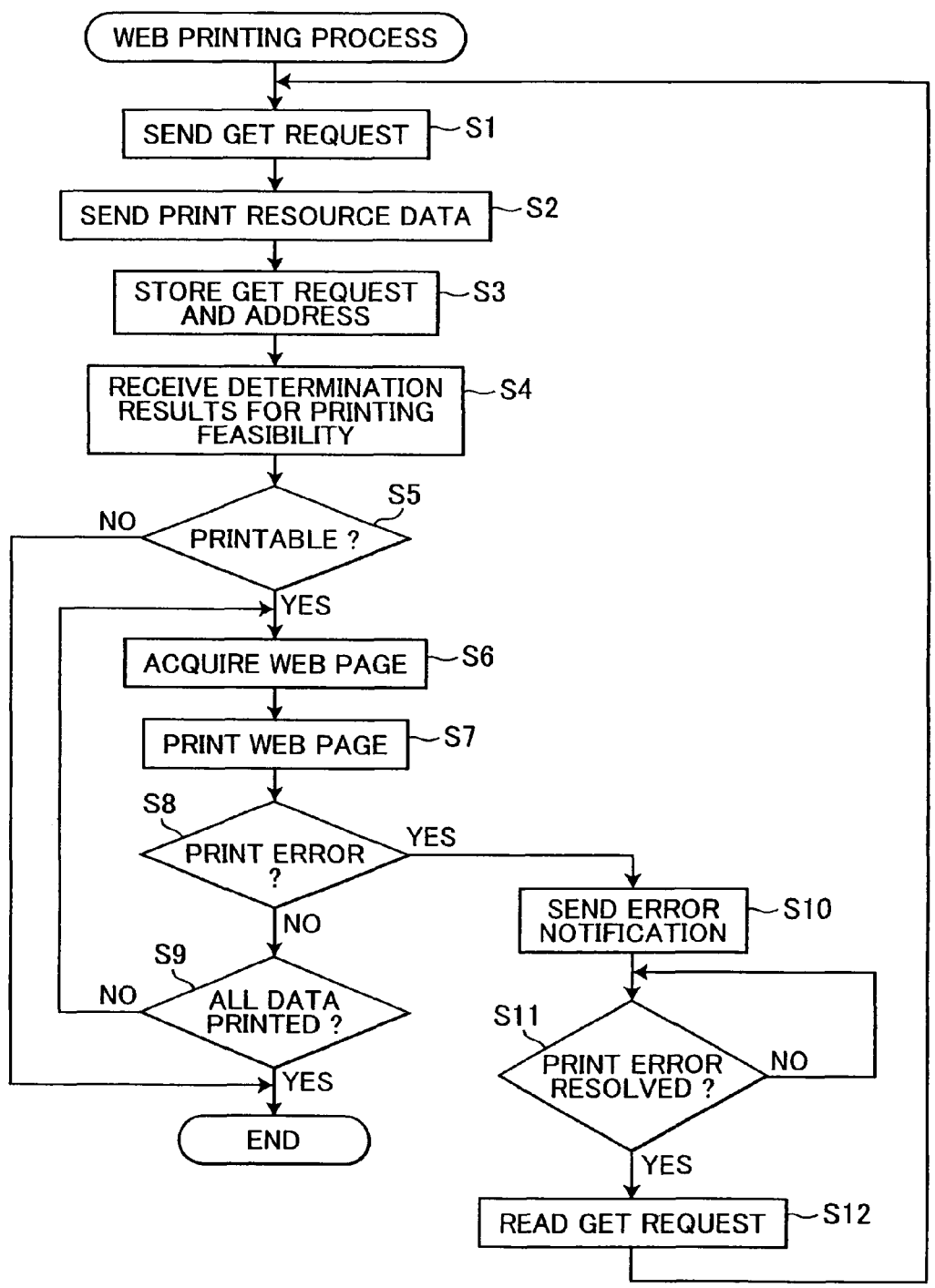
FIG. 3 is a flowchart representing a web printing process according to a first embodiment of the present invention.

FIG. 3 shows the flowchart representing the web printing process executed by the CPU 10. The web printing process is started when a user performs a prescribed operation to specify a URL that indicates an address within the web server C providing desired web page. The user can operate the various keys 22A, 22B, and 22C to specify the URL. Alternatively, the user can specify a registered URL using a single operation. When the process starts, first in S1, the specified URL is transferred to the Internet 1 as a GET request based on Hyper-Text Transfer Protocol (HTTP) and is delivered to the web server C.

In S2, the CPU 10 also sends print resource data to the web server C along with the GET request. The print resource data indicates the amount of remaining ink and the number of remaining sheets of paper at the current point in time, and is used by the web server C for determining whether the requested web page can be printed. The print resource data may also include the type of paper available when a separate sensor is provided in the printing unit 21 of the data terminal A for detecting types of paper.

In S3, the CPU 10 stores the transmitted GET request and an address data of the web server C into the RAM 12. In S4, the CPU 10 receives a determination result from the web server C to which the GET request was transmitted.

In S5, the CPU 10 determines whether or not the web page is printable based on the determination results from the web server C. If not (S5:NO), then the CPU 10 ends the web printing process without acquiring the web page from the web server C and without printing the web page. On the other hand, if the CPU 10 determines in S5 that the web page is printable (S5:YES), then in S6, the CPU 10 downloads the web page from the web server C by IP datagrams or IP packets based on Transmission Control Protocol/Internet Protocol (TCP/IP). The downloaded data for the web page is temporarily buffered in the RAM 12 until the printing process is executed.

In S7, the downloaded web page is printed. In S8, the CPU 10 monitors the printing process to determine whether a print error, such as a paper jam, has occurred. If no errors have occurred (S8:NO), then the CPU 10 determines in S9 whether or not all data for the web page has been printed. If all data has been printed (S9:YES), then the CPU 10 ends the web printing process. On the other hand, if all data has not been printed (S9:NO), then the process returns to S6.

If it is determined in S8 that a print error has occurred (S8:YES), then in S10, the CPU 10 notifies the web server C of the error. Subsequently, the data terminal A temporarily disconnects from the Internet 1, or connects to a different site from the current URL while maintaining a connection with the Internet 1.

Then, in S11, the CPU 10 monitors whether or not the print error is resolved. The print error can be resolved by the user clearing the paper jam, for example. If the print error is not resolved (S11:NO), then the CPU 10 waits until the print error is resolved. If the print error is resolved (S11:YES), then in S12, the CPU 10 reads the GET request stored in the RAM 12, and the process returns to S1. In this manner, the processes beginning from S1 are automatically executed.

Hence, the user can obtain the web page that was being printed when the printing process was interrupted due to occurrence of print error, without having to specify the URL again after resolving the print error.

Figure 4:
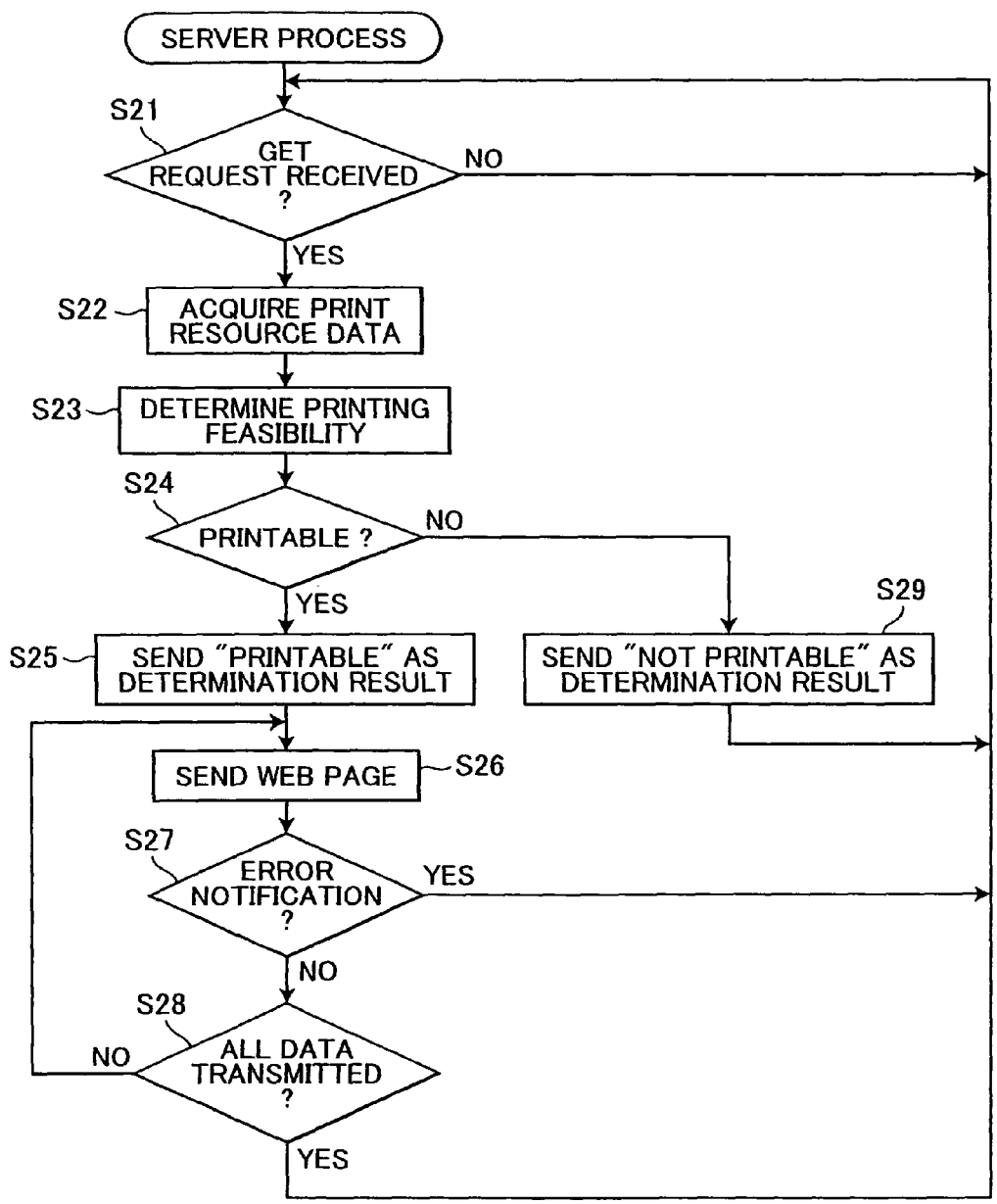
FIG. 4 is a flowchart representing a server process according to the first embodiment of the present invention.

In the meantime, while the data terminal A executes the web printing process described above, the web server C executes the server process, which will be described with reference to the flowchart of FIG. 4. In the server process, first in S21, the web server C monitors the communication line for the reception of a GET request. If no GET request is received (S21:NO), then the web server C waits until a GET request is received. If the web server C receives a GET request (S21: YES), then in S22, the web server C receives print resource data which have been transmitted along with the GET request from the data terminal A in S2 of the above-described web printing process. Then, in S23, the web server C uses the print resource data to determine whether or not the data terminal A is capable of printing the requested web page.

If the web server C determines that the data terminal A can print the requested web page (S24:YES), then in S25, the web server C notifies the data terminal A of the results of this determination. In S26, the web server C transmits data for the requested web page to the data terminal A by IP datagrams or IP packets based on TCP/IP. As a result, the data terminal A attempts to download and print data for the web page.

In S27, the web server C monitors communications to determine whether notification of an error is received from the data terminal A while the data terminal A is printing the web page. If an error notification is received (S27:YES), then the process returns to S21. On the other hand, if an error notification is not received (S27:NO), then the web server C determines in S28 whether or not all data for the web page has been transmitted. If so (S28:YES), then the process returns to S21. If not (S28:NO), then the process returns to S26.

If the web server C determines in S24 that the data terminal A cannot print the web page (S24:NO), then in S29, the web server C notifies the data terminal A of the determination results, and the process returns to S21. In this case, the requested web page is not transmitted to the data terminal A.

With the data terminal A and the web server C described above, the data terminal A can obtain a web page even when a paper jam occurs while printing the web page or when the data terminal A lacks sufficient ink or pages of recording paper to print the web page, by automatically resending the same GET request to obtain the web page data after the print error has been resolved. Accordingly, the data terminal A can automatically reprint the web page without requiring the user to specify the URL again after recovering from the print error, thereby reducing the user's operating load.

Further, since the web server C determines whether or not the requested web page can be completely printed or not based on the print resource data prior to the printing operation, it is possible to minimize the possibility of a print error occurring during or just prior to printing operations.

Next, a web printing process and a server process according to a second embodiment of the present invention will be described.

Figure 5:
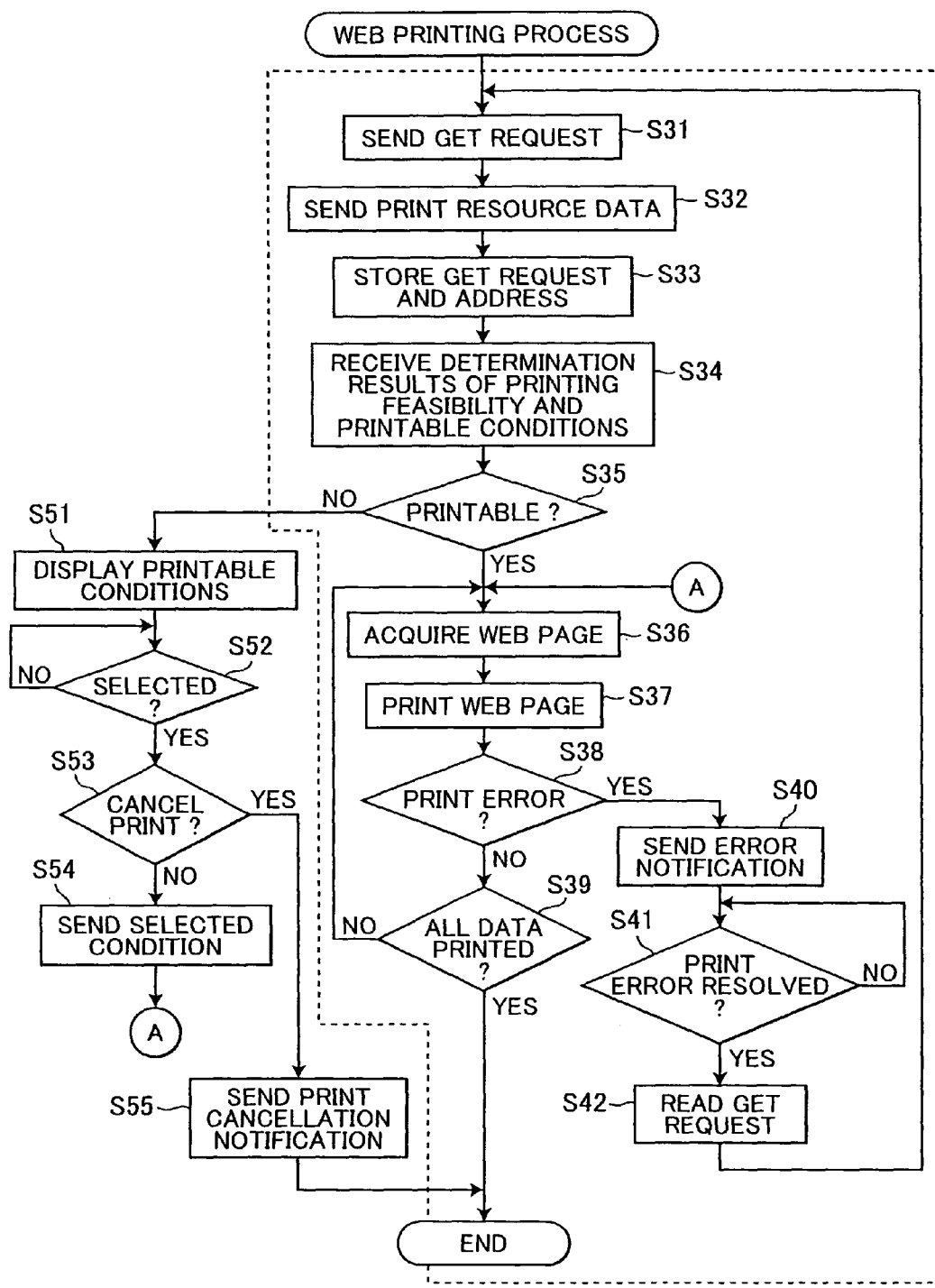
FIG. 5 is a flowchart representing a web printing process according to a second embodiment of the present invention.

FIG. 5 is a flowchart representing the web printing process according to the second embodiment of the present invention. Because the processes in S31 through S42 of FIG. 5 are nearly identical to the processes in S1 through S12 of FIG. 3, description of these processes (processes surrounded by a broken line) will be omitted, and only differing parts of the processes will be described.

In S34, the CPU 10 receives the determination results of printing feasibility from the web server C as in S4 of FIG. 3. However, the CPU 10 also receives printable conditions from the web server C in S34. The printable conditions indicate restrictions on the printing process presented by the web server C based on the print resource data. For example, while it may not be possible for the data terminal A to print a web page, there are cases that the data terminal A might be able to print the web page by an N-in-1 print, wherein a plurality of pages are reduced and printed on a single page, a monochrome print mode, or a print that disregards paper type. Here, the web server C needs not provide printable conditions when the determination results indicate that printing is possible.

In S35, if it is determined that printing is not possible based on the determination results of printing feasibility (S35:NO), then in S51 the CPU 10 displays the printable conditions presented by the web server C on the display unit 23, enabling the user to make a selection. The selections displayed on the display unit 23 at this time might include "N-in-1 print", "monochrome print", "print regardless of paper type", and the like. The selections also include "cancel" for canceling the printing operation.

In S52, it is determined whether or not a selection is made by the user. If not (S52:NO), then the process waits until a selection is made. If so (S52:YES), then in S53, the CPU 10 determines whether or not the selection is made for the "cancel". If not (S53:NO), then in S54 the CPU 10 notifies the web server C of the selection selected by the user. Then, the process proceeds to S36, where the CPU 10 acquires the web page and automatically performs a print based on the selected condition.

On the other hand, if the user has selected the "cancel" (S53:YES), then in S55, the CPU 10 notifies the web server C of the print cancellation, and ends the web printing process without acquiring the web page from the web server C and without printing the data.

Figure 6:
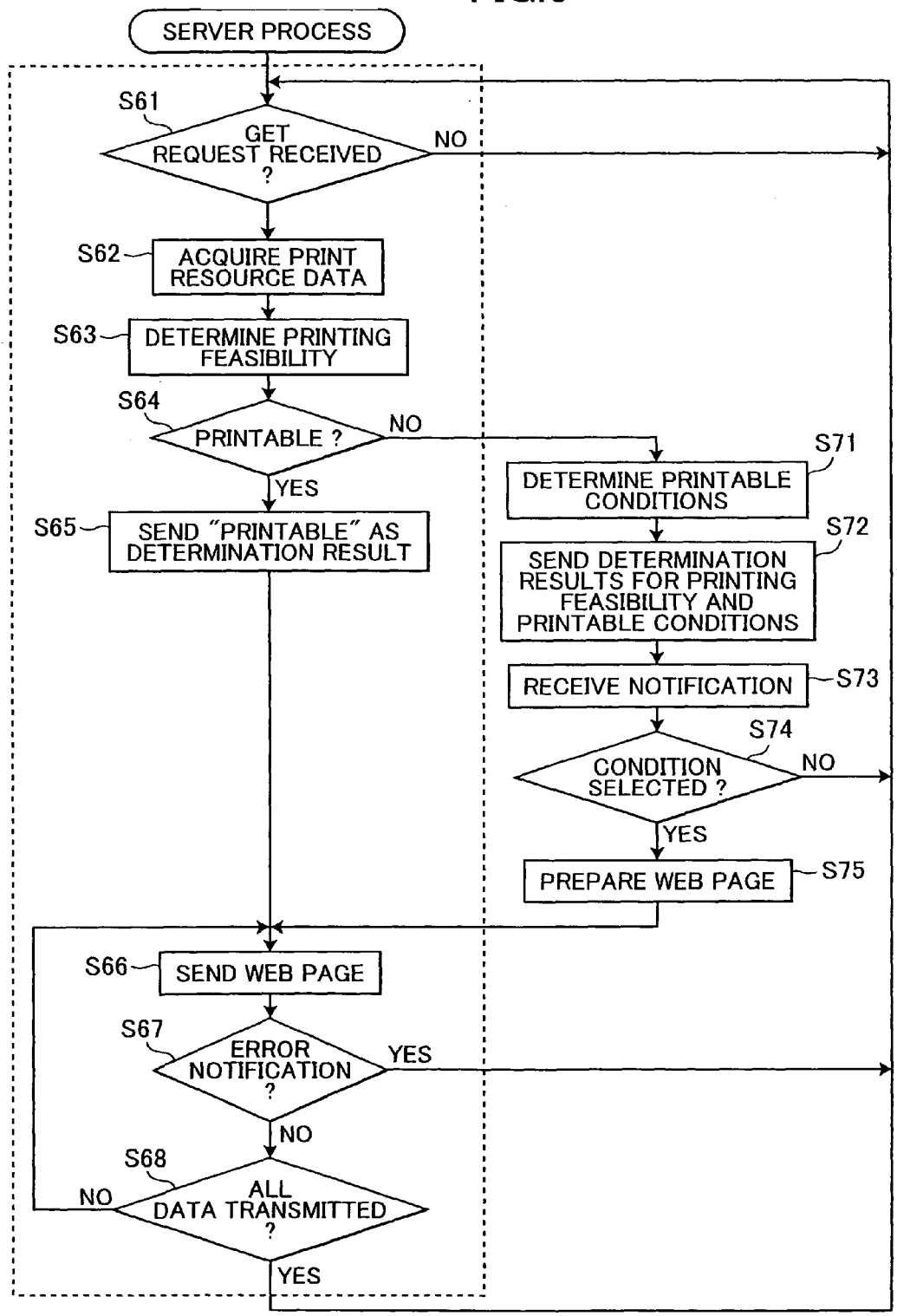
FIG. 6 is a flowchart representing a server process according to the second embodiment of the present invention.

In the meantime, while the data terminal A is executing the web printing process described above, the web server C is executing the server process of FIG. 6. Here, the processes in S61 through S68 of FIG. 6 are nearly identical to the processes in S21 through S28 of FIG. 4. Accordingly, a description of these processes (processes surrounded by a broken line) will be omitted, and only differing parts of the processes will be described.

In FIG. 6, after S61 through S63, when the web server C determines in S64 that printing is not possible based on the print resource data (S64:NO), then in S71 the web server C determines printable conditions based on the print resource data.

Then, in S72, the web server C notifies the data terminal A of the determination results for printing feasibility as well as the printable conditions when such conditions exist. Here, if the data terminal A cannot perform print operation for the web page under any conditions, then the web server C transmits only a print cancellation selection as the printable condition to the data terminal A.

Next in S73, the web server C receives a notification from the web terminal A, and then in S74, the web server C determines the notification from the data terminal A is of a selected condition. If so (S73:YES), then in S74, the web server C prepares the web page according to the selected condition and advances to S66. On the other hand, if not (S73:NO), then this means that the received notification is of a print cancellation. In this case, the process returns to S61, without the web server C transmitting the requested web page to the data terminal A.

As described above, the data terminal A and the web server C of the second embodiment provide the same effects as the first embodiment described above. In addition, the data terminal A of the second embodiment can print web pages under printable conditions presented by the web server C even when the data terminal A cannot print the web page in its original state due to insufficient ink or paper. Therefore, the user can obtain a web page in the form of printed material, while avoiding print errors as much as possible.

Moreover, the data terminal A promptly print the data content or cancel the printing operation based on the determination results from the web server C.

Next, a web printing process and a server process according to a third embodiment of the present invention will be described with reference to FIGS. 7 and 8.

Figure 7:
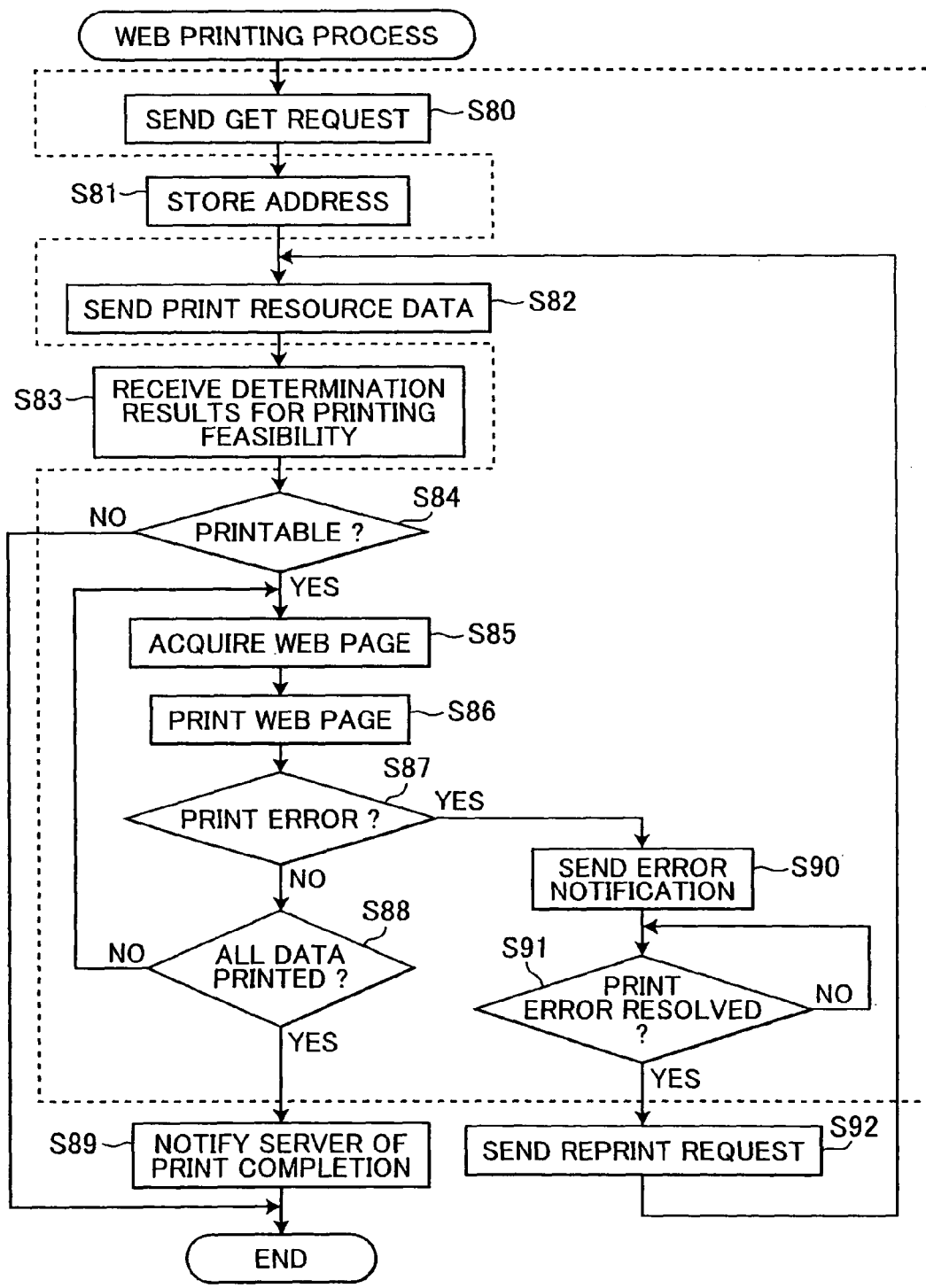
FIG. 7 is a flowchart representing a web printing process according to a third embodiment of the present invention.

FIG. 7 is a flowchart representing the web printing process of the third embodiment executed by the data terminal A. Since the process of FIG. 7 is similar to the process of FIG. 3, description of the common processes (processes surrounded by a broken line) will be omitted, and only differing processes will be described.

After a GET request is sent to the web server C in S80, in S81, the address data of the web server C is stored. Then in S82, the print resource data is sent to the web server C in the same manner as in S2 of FIG. 3. Subsequently, the CPU 10 receives in S83 the determination results of printing feasibility from the web server C without storing the GET request. Then, the process proceeds to S84. Here, S84 through S88 are the same as S5 through S9 of FIG. 3. In S88, if the CPU 10 determines that all data for the web page has been printed (S88:YES), then in S89 the CPU 10 notifies the web server C that printing has completed and ends the web printing process. This process is necessary because it is possible that the data terminal A will send a reprint request to the web server C even after the web server C has completely transmitted the web page to the data terminal A.

That is, if a print error is resolved in S91 (S91:YES), then in S92, the CPU 10 transmits a reprint request to the web server C whose address data was stored in S81, and the process returns to S82 so that the CPU 10 transmits the print resource data along with the reprint request. Here, the reprint request transmitted in S92 includes a retransmission command, and does not include the URL.

Figure 8:
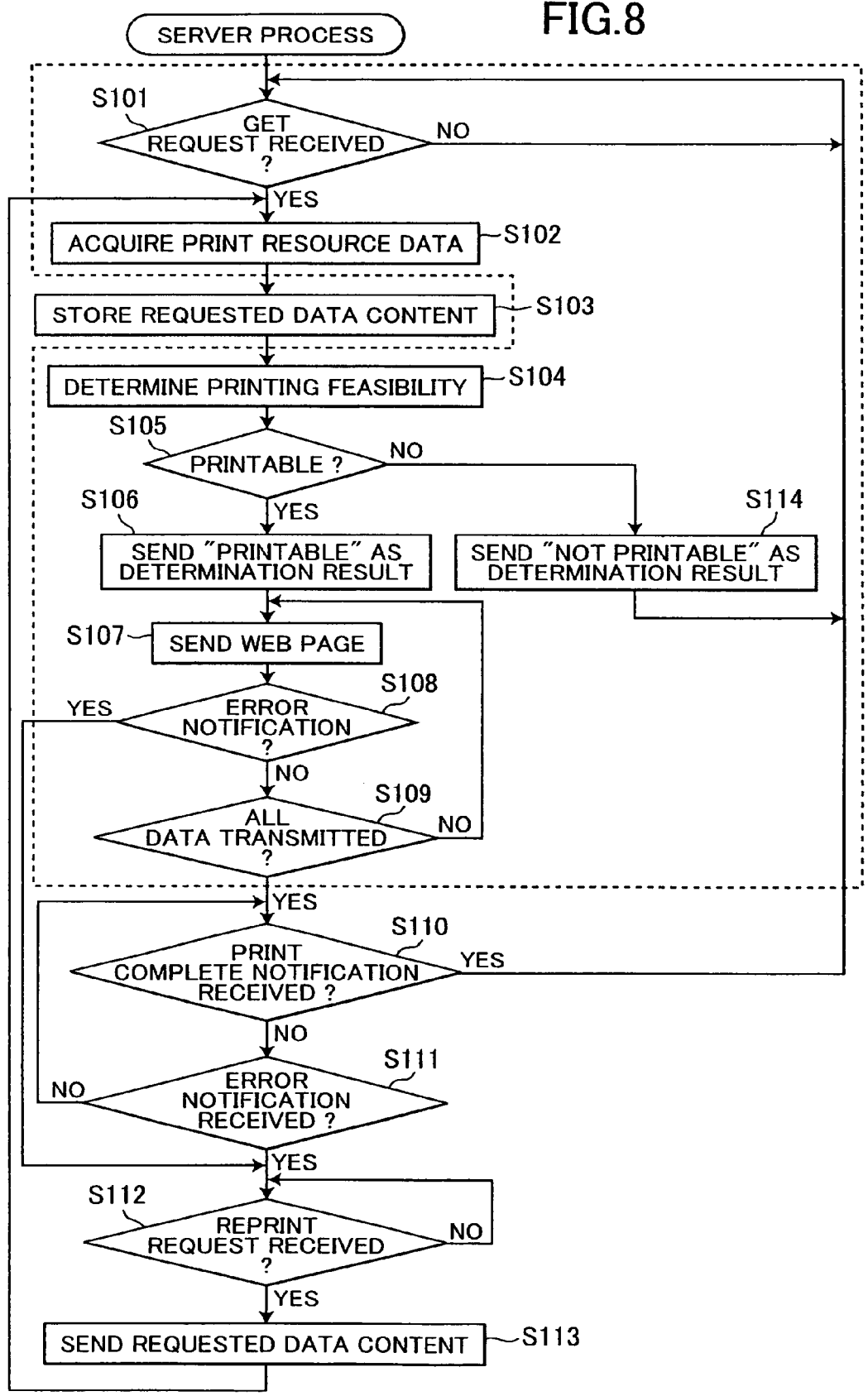
FIG. 8 is a flowchart representing a server process according to the third embodiment of the present invention.

In the meantime, while the data terminal A is executing the web printing process described above, the web server C performs the server process of FIG. 8. In FIG. 8, after the web server C acquires a GET request (S101:YES) and print resource data (S102) from the data terminal A, in S103, the web server C stores the data content (web page) in association with the data terminal A. Then, the process proceeds to S104. Here, S104 through S109 and S114 are similar to S23 through S28 and S29 of FIG. 4.

If it is determined in S108 that an error notification has not been received (S108:NO), then the web server C determines in S109 whether all data for the web page has been transmitted. If so (S109:YES), then in S110, the web server C determines whether or not a print complete notification has been received from the data terminal A.

If a print complete notification has not been received (S110:NO), then in S111, the web server C determines whether or not an error notification has been received from the data terminal A. If so (S111:YES), then in S112, the web server C determines whether or not a reprint request has been received from the data terminal A. If a reprint request has been received (S112:YES), then in S113, the web server C reads data content that has been stored in S103, and the process returns to S102.

On the other hand, if it is determined in S112 that a reprint request has not been received (S112:NO), then the process waits until a reprint request is received. In S111, if an error notification has not been received in (S111:NO), then the process returns to S110. In S110, if a print complete notification has been received (S110:YES), then the web server C returns to S101.

According to the present embodiment, when a print error occurs, the data terminal A can reprint the web page simply by issuing a reprint request to the web server C. In this manner, the terminal A can automatically reprint the data content after the print error has been resolved, thereby reducing the operating load on the user.

Figure 9:
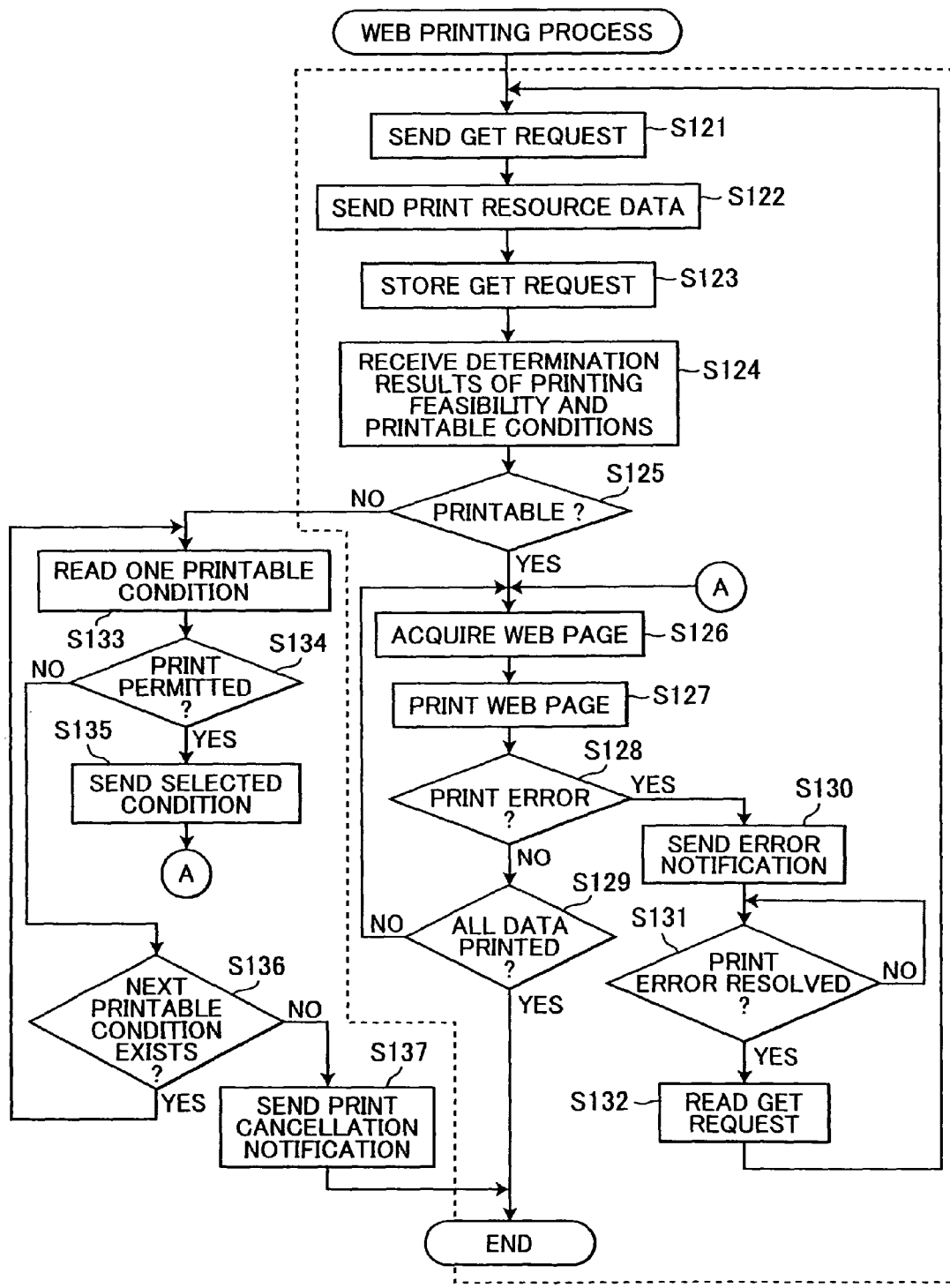
FIG. 9 is a flowchart representing a web printing process according to a fourth embodiment of the present invention.

Next, a web printing process according to a fourth embodiment will be described with reference to FIGS. 9 and 10. FIG. 9 is a flowchart representing a web printing process of the present embodiment executed by the data terminal A. Since the process of FIG. 9 is similar to the process of FIG. 3, description of the common processes (processes surrounded by a broken line) will be omitted, and only differing processes will be described.

In FIG. 9, if the CPU 10 determines in S125 that the web page is not printable (S125:NO), then in S133, the CPU 10 reads one printable condition received from the web server C in S124. Then in S134, the CPU 10 determines whether or not printing under the printable condition is permitted by the user. Here, as shown in FIG. 10, the user can preset whether to permit printing for each print condition. If the printing under the printable condition is not permitted (S134:NO), then the CPU 10 determines in S136 whether or not a next printable condition exists. If not (S136:NO), then a print cancellation notification is sent to the web server C in S137, and the process ends. On the other hand, if so (S136:YES), then the next printable condition is read in S133, and it is determined in S134 whether or not printing under the printable condition is permitted. If so (S134:YES), then in S135, the printable condition is transmitted to the web server C as a selected condition. Afterwards, the process proceeds to S126.

As described above, according to the present embodiment, the user can preset whether or not to permit printing for printing conditions, and the CPU 10 automatically select and transmit one of cancellation notification and a selected condition to the web server. Accordingly, the facsimile device A according to the present embodiment can automatically initiate a print according to the printable conditions presented by the web server C.

Here, when there are a plurality of print conditions, the user can determine priorities by arranging the print conditions in the order of descending priorities in the table of FIG. 10.

Since a server process corresponding to the web printing process of the fourth embodiment is the same as the server process of the third embodiment, description thereof is omitted.

While the invention has been described in detail with reference to specific embodiments thereof, it would be apparent to those skilled in the art that many modifications and variations may be made therein without departing from the spirit of the invention, the scope of which is defined by the attached claims.

For example, the data terminal A is constantly connected to the Internet 1 via an ADSL in the embodiment described above. However, the data terminal A could be constantly connected to the Internet 1 via a CATV network or FTTH. Further, the present invention is not limited to a constant connection, but can also be applied to a dialup connection or the like.

In the embodiment described above, the image forming device features a web printing process for printing web pages, but it is obvious that the same process of the present invention can be applied to the acquisition and printing of e-mail and the like.

The error notification transmitted from the data terminal A to the web server C can also include data detailing which page was being printed when the print error occurred. Accordingly, after the print error has been cleared, data beginning from the page that was being printed when the error occurred can be downloaded from the web server C and printed to avoid reprinting pages.

Rather than the inkjet printing method, the data terminal A can employ such printing methods as electrophotography using toner, and sublimation or heat transfer using an ink ribbon.

What is claimed is:

1. An image forming device comprising:
   a communication unit that transmits a transmission request data to a server on a network and that receives data content that the server transmits in response to the transmission request data, the transmission request data specifying the data content and the server in which the data content is stored;
   a print unit that prints the data content;
   a memory that stores the transmission request data that the communication unit transmits to the server each time the communication unit transmits the transmission request data;
   an error detecting unit that detects print error that occurs before the print unit completes printing the data content;
   an error-recovery detecting unit that detects recovery of the print error; and
   a control unit that controls the communication unit,
   wherein when the error detecting unit detects the print error, the control unit controls the communication unit to retransmit the transmission request data, which has remained stored in the memory since the transmission request data was transmitted and which specifies the data content corresponding to the print error, to the server that stores the data content corresponding to the print error after the error-recovery detecting unit detects the recovery.

2. The image forming device according to claim 1, wherein the communication unit transmits a print resource data along with the transmission request data, the print resource data being required by the server to determine whether the print unit is capable of printing the data content.

3. The image forming device according to claim 2, further comprising a determining unit that determines whether or not to print the data content, wherein the communication unit also receives determination results that the server transmits in response to the print resource data, and the determining unit determines whether or not to print the data content based on the received determination results.

4. The image forming device according to claim 3, further comprising a displaying unit, wherein the communication unit also receives printable conditions from the server along with the determination results, and the display unit displays the received printable conditions.

5. The image forming device according to claim 4, further comprising a setting storing unit that stores a setting, wherein the determining unit determines to print the data content when at least one of the printable conditions matches the setting.

6. The image forming device according to claim 1, wherein the control unit controls the communication unit to transmit an error notification to the server when the error detecting unit detects the print error.

7. An image forming device comprising:
   a communication unit that transmits a transmission request data to a server on a network and that receives data content that the server transmits in response to the transmission request data, the transmission request data specifying the data content;
   a print unit that prints the data content;

a memory that stores an address of the server to which the communication unit transmits the transmission request data each time the communication unit transmits the transmission request data;

an error detecting unit that detects print error that occurs before the print unit completes printing the data content;

an error-recovery detecting unit that detects recovery of the print error; and a control unit that controls the communication unit, wherein when the error detecting unit detects the print error, the control unit specifies the server that stores the data content which corresponds to the print error based on the address stored in the memory, and the control unit controls the communication unit to transmit a retransmission request to the server that is specified by the address stored in the memory after the error-recovery detecting unit detects the recovery, the retransmission request requesting the server to retransmit the data content which the server has transmitted in response to the transmission request data, and wherein the address has remained stored in the memory since the transmission request data was transmitted.

8. The image forming device according to claim 7, wherein the communication unit transmits a print resource data along with the transmission request data, the print resource data being required by the server to determine whether the print unit is capable of printing the data content.

9. The image forming device according to claim 8, further comprising a determining unit that determines whether or not to print the data content, wherein the communication unit also receives determination results that the server transmits in response to the print resource data, and the determining unit determines whether or not to print the data content based on the received determination results.

10. The image forming device according to claim 9, further comprising a displaying unit, wherein the communication unit also receives printable conditions from the server along with the determination results, and the display unit displays the received printable conditions.

11. The image forming device according to claim 10, further comprising a setting storing unit that stores a setting, wherein the determining unit determines to print the data when at least one of the printable conditions matches the setting.

12. A network server comprising:

a communication unit that receives a transmission request data and a print resource data from an external image forming device on a network and that transmits data content to the external image forming device in response to the transmission request data, the transmission request data specifying the data content, the print resource data indicating a print resource of the external image forming device from which the transmission request data and the print resource data is transmitted;

a determining unit that determines whether or not the external image forming device is capable of printing the data content based on the print resource data; and a notifying unit that notifies the external image forming device of a determination result of the determining unit, wherein when the determining unit determines that the external image forming device is capable of printing the data content, the notifying unit transmits, as the determination result, the data content to the external image forming device which has transmitted the transmission request data and the print resource data, and wherein when the determining unit determines that the external image forming device is incapable of printing the data content, the notifying unit transmits, as the determination result, data indicating that the external image forming device is incapable of printing the data content to the external image forming device which transmits the transmission request data and the print resource data.

13. The network server according to claim 12, further comprising a memory that stores the data content that the communication unit has transmitted to the external image forming device, wherein the communication unit retransmits the data content stored in the memory to the external image forming device when the communication unit receives a retransmission request data from the external image forming device.

14. A communication method comprising the steps of:

a) transmitting a transmission request data to a server on a network, the transmission request data specifying the data content and the server in which the data content is stored;

b) storing, into a memory, the transmission request data transmitted to the server each time the transmission request data is transmitted in the step a);

c) receiving data content that the server transmits in response to the transmission request data;

d) printing the data content;

e) detecting whether or not print error occurred before the printing of the data content has completed;

f) detecting recovery of the print error if the print error was detected in the step e); and g) retransmitting the transmission request data, which has been stored in the memory since the transmission request data was stored in step b) and which specifies the content data corresponding to the print error detected in step e), to the server that stores the data content corresponding to the print error detected in step e) after the recovery was detected in step f).

15. A communication method comprising the steps of:

a) transmitting a transmission request data to a server on a network, the transmission request data specifying the data content;

b) storing, into a memory, an address of the server to which the transmission request data was transmitted in step a) and which stores in the data content specified by the transmission request data, each time the transmission request data is transmitted in step a);

c) receiving data content that the server transmits in response to the transmission request data;

d) printing the data content;

e) detecting whether or not print error occurred before the printing of the data content has completed;

f) detecting recovery of the print error if the print error was detected in the step e);

g) specifying, based on the address stored in the memory, which has been stored since the address was stored in step b), the server to which the transmission request data that specifies the data content corresponding to the print error detected in step e) has been transmitted; and h) transmitting a retransmission request data to the server specified in step g) whose address is stored in the memory after the recovery was detected in step f).

16. A communication method of a server, comprising the steps of:

a) receiving a transmission request and a resource information from an external image forming device, the transmission request requesting the server to transmit data content to the external image forming device, the transmission request specifying the data content, the print resource information indicating a print resource of the external image forming device from which the transmission request and the print resource information is;

b) determining whether or not the external image forming device can print the data content based on the resource information;

c) determining print conditions under which the external image forming device is capable of printing the data content; and d) notifying a determination result and the determined print conditions to the external image forming device, wherein when the determining in step b) determines that the external image forming device is capable of printing the data content, the notifying in step c) transmits the data content, as the determination result, to the external image forming device from which the transmission request and the print resource information have been received in step a), and wherein when the determining in step b) determines that the external image forming device is incapable of printing the data content, the notifying in step c) transmits, as the determination result, data indicating that the external image forming device is incapable of printing the data content to the external image forming device from which the transmission request and the print resource information have been received in step a).

17. The communication method according to claim 16, further comprising step of e) storing the data content into a memory.

18. The network server according to claim 12, wherein the print resource data includes at least one of a number of print medium sheets remaining in the external image forming device or a type of print medium sheet used in the external image forming device.

19. The communication method according to claim 16, wherein the print resource data includes at least one of a number of print medium sheets remaining in the external image forming device or a type of print medium sheet used in the external image forming device.

20. The network server according to claim 12, wherein the determining unit further determines print conditions under which the external image forming device is capable of printing the data content, and the notifying unit notifies the external image forming device of the determined print conditions along with the determination result of the determining unit.

* * * * *